(12) United States Patent
Maruo et al.

(10) Patent No.: US 11,947,175 B2
(45) Date of Patent: Apr. 2, 2024

(54) OPTICAL FIBER CABLE

(71) Applicant: Nippon Telegraph and Telephone Corporation, Tokyo (JP)

(72) Inventors: Yuta Maruo, Musashino (JP); Hiroaki Tanioka, Musashino (JP); Hisashi Izumita, Musashino (JP); Yusuke Yamada, Tokyo (JP); Shigekatsu Tetsutani, Tokyo (JP); Yohei Endo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 305 days.

(21) Appl. No.: 17/430,419

(22) PCT Filed: Jan. 31, 2020

(86) PCT No.: PCT/JP2020/003591
§ 371 (c)(1),
(2) Date: Aug. 12, 2021

(87) PCT Pub. No.: WO2020/166369
PCT Pub. Date: Aug. 20, 2020

(65) Prior Publication Data
US 2022/0155547 A1 May 19, 2022

(30) Foreign Application Priority Data

Feb. 14, 2019 (JP) ................................. 2019-024863

(51) Int. Cl.
*G02B 6/44* (2006.01)
*H01B 7/18* (2006.01)
*H01B 7/38* (2006.01)

(52) U.S. Cl.
CPC ........... *G02B 6/4431* (2023.05); *G02B 6/443* (2013.01); *H01B 7/18* (2013.01); *H01B 7/385* (2013.01)

(58) Field of Classification Search
CPC .............................. G02B 6/4431; H01B 7/385
See application file for complete search history.

(56) References Cited

U.S. PATENT DOCUMENTS

| 5,642,452 A | 6/1997 | Gravely et al. |
| 2002/0044751 A1 | 4/2002 | Logan et al. |

(Continued)

FOREIGN PATENT DOCUMENTS

| EP | 2784788 | 10/2014 |
| JP | S62117213 A | 5/1987 |

(Continued)

*Primary Examiner* — Sung H Pak
(74) *Attorney, Agent, or Firm* — Fish & Richardson P.C.

(57) ABSTRACT

The present disclosure intends to facilitate tearing a metal sheath even in a case where the metal sheath is incorporated in an optical fiber cable. The optical fiber cable of the present disclosure includes a cable core arranged at a central portion and accommodating a plurality of optical fibers gathered together, an inner layer sheath arranged on an outer circumference of the cable core and sheathing the cable core, a metal sheath arranged on an outer circumference of the inner layer sheath and wound around the inner layer sheath, an outer layer sheath arranged on an outer circumference of the metal sheath and sheathing the metal sheath, and at least one outer sheath tearing string arranged in a longitudinal direction inside the metal sheath.

4 Claims, 14 Drawing Sheets

(56) References Cited

U.S. PATENT DOCUMENTS

| | | |
|---|---|---|
| 2002/0122640 A1 | 9/2002 | Strong et al. |
| 2018/0106977 A1 | 4/2018 | Ohno et al. |
| 2018/0231729 A1 | 8/2018 | Baetz et al. |
| 2018/0348460 A1 | 12/2018 | Sahoo et al. |
| 2020/0209505 A1 | 7/2020 | Ohno et al. |

FOREIGN PATENT DOCUMENTS

| | | | | |
|---|---|---|---|---|
| JP | 2002098871 | | 4/2002 | |
| JP | 2003322782 | | 11/2003 | |
| JP | 2007011020 | | 1/2007 | |
| JP | 2017072801 | | 4/2017 | |
| JP | 2019113618 | | 7/2019 | |
| JP | 2019113619 | | 7/2019 | |
| JP | 2019144585 A | * | 8/2019 | ........... G02B 6/4429 |

\* cited by examiner

| d(mm) | $\theta_1 + \theta_2$(°) | $L_1$(mm) | EXPRESSION | WORKABILITY | NOTE |
|---|---|---|---|---|---|
| 5.4 | 59 | 22.7 | ○ | ○ | |
| 6.1 | 82 | 24.4 | ○ | ○ | 24 CORES |
| 6.0 | 95 | 30.0 | × | × | |
| 6.9 | 102 | 26.4 | ○ | ○ | |
| 6.5 | 135 | 23.0 | ○ | ○ | 200 CORES |
| 6.8 | 150 | 26.0 | × | × | |

OPTICAL FIBER CABLE

CROSS-REFERENCE TO RELATED APPLICATIONS

This application is a National Stage application under 35 U.S.C. § 371 of International Application No. PCT/JP2020/003591, having an International Filing Date of Jan. 31, 2020, which claims priority to Japanese Application Serial No. 2019-024863, filed on Feb. 14, 2019. The disclosure of the prior application is considered part of the disclosure of this application, and is incorporated in its entirety into this application.

TECHNICAL FIELD

The present disclosure relates to an optical fiber cable that can protect a cable core even if it is bitten by animals and is easy in taking out the cable core.

BACKGROUND ART

In an area where optical fibers may be damaged because of the batting by birds such as woodpeckers or the biting by animals such as squirrels, optical fiber cables each incorporating a metal sheath are used as a countermeasure against bird, insect, and animal damages (see, for example, Patent Literature 1). A cross-sectional structure of a related optical fiber cable will be described with reference to FIG. 1. The optical fiber cable illustrated in FIG. 1 includes a cable core 51, a metal sheath 52, and a polyethylene jacket 53. The optical fiber cable provided with the bird-insect-animal damage countermeasure is formed from the cable core 51, the metal sheath 52 coated so as to cover the cable core 51, and the polyethylene jacket 53. The optical fiber cable has the metal sheath 52, and thus when accessing the cable core 51 from the optical fiber cable, a high-strength cable jacket cutter is used as a dedicated tool to tear the metal sheath 52.

However, when tearing the metal sheath using the high-strength cable jacket cutter, which is the dedicated tool, an event in which an optical fiber accommodated in the cable core 51 is cut unintentionally because of excessive entering of a blade of the tool occurs occasionally. In addition, the work for tearing the metal sheath while making fine adjustment to avoid excessive entering of the blade is highly skillful, and accordingly the work is time consuming.

CITATION LIST

Patent Literature

Patent Literature 1: Japanese Patent Laid-Open No. 62-117213

SUMMARY OF THE INVENTION

Technical Problem

An object of the present disclosure is to facilitate tearing a metal sheath even in a case where the metal sheath is incorporated in an optical fiber cable.

Means for Solving the Problem

To achieve the above object, the optical fiber cable of the present disclosure includes an outer sheath tearing string extending in a longitudinal direction inside the metal sheath. Including the outer sheath tearing string can facilitate tearing the metal sheath.

Specifically, the optical fiber cable of the present disclosure includes a cable core arranged at a central portion and accommodating a plurality of optical fibers gathered together, an inner layer sheath arranged on an outer circumference of the cable core and sheathing the cable core, a metal sheath arranged on an outer circumference of the inner layer sheath and wound around the inner layer sheath, an outer layer sheath arranged on an outer circumference of the metal sheath and sheathing the metal sheath, and at least one outer sheath tearing string arranged in a longitudinal direction inside the metal sheath.

Including the outer sheath tearing string can facilitate tearing the metal sheath.

In the optical fiber cable of the present disclosure, the outer sheath tearing string may be arranged between the metal sheath and the inner layer sheath. Including the outer sheath tearing string can facilitate tearing the metal sheath.

In the optical fiber cable of the present disclosure, the outer sheath tearing string may be arranged in such a manner that at least a part thereof is embedded in an outer peripheral surface of the inner layer sheath.

This arrangement can prevent the outer sheath tearing string from moving in the longitudinal direction inside the metal sheath.

The optical fiber cable of the present disclosure may further include at least one inner sheath tearing string arranged in a longitudinal direction inside a layer of the inner layer sheath.

Including the inner sheath tearing string can facilitate tearing the inner layer sheath.

The optical fiber cable of the present disclosure may further include a continuous protrusion arranged on the outer peripheral surface of the inner layer sheath and extending along the outer sheath tearing string.

Identifying a position of the outer sheath tearing string becomes easy.

The optical fiber cable of the present disclosure may further include the continuous protrusion arranged on the outer peripheral surface of the inner layer sheath and extending along the outer sheath tearing string, and the inner sheath tearing string and the outer sheath tearing string may be arranged on the same radial axis of the optical fiber cable.

Identifying the positions of the inner sheath tearing string and the outer sheath tearing string becomes easy.

In the optical fiber cable of the present disclosure, it is desirable that the metal sheath has a part single-wounded and the rest double-wounded around the outer circumference of the cable core, and the at least one outer sheath tearing string is arranged inside the single-wounded part.

The outer sheath tearing string facilitates tearing the metal sheath.

To achieve the above object, the optical fiber cable of the present disclosure includes a protective sheath tearing string provided in a longitudinal direction inside a layer of an inner layer sheath.

Including the protective sheath tearing string can facilitate tearing the inner layer sheath, the metal sheath, and the outer layer sheath.

Specifically, the optical fiber cable of the present disclosure includes a cable core arranged at a central portion and accommodating a plurality of optical fibers gathered together, an inner layer sheath arranged on an outer circumference of the cable core and sheathing the cable core, a metal sheath arranged outside the inner layer sheath and wound around the inner layer sheath, an outer layer sheath arranged on an outer circumference of the metal sheath and sheathing the metal sheath, and at least one protective sheath tearing string arranged in a longitudinal direction inside a layer of the inner layer sheath.

The protective sheath tearing string can facilitate tearing the inner layer sheath, the metal sheath, and the outer layer sheath.

The optical fiber cable of the present disclosure may further include a continuous protrusion arranged on an outer peripheral surface of the inner layer sheath and extending along the protective sheath tearing string.

Identifying a position of the protective sheath tearing string becomes easy.

In the optical fiber cable of the present disclosure, it is desirable that the metal sheath has a part single-wounded and the rest double-wounded around the outer circumference of the cable core, and the at least one protective sheath tearing string is arranged inside the single-wounded part.

The protective sheath tearing string facilitates tearing the metal sheath.

Each aspect of the above disclosure can be combined with another one if it is possible.

Effects of the Invention

According to the present disclosure, it is possible to facilitate tearing a metal sheath even when the metal sheath is incorporated in an optical fiber cable.

BRIEF DESCRIPTION OF DRAWINGS

FIG. 9 is a table showing validity of a configuration of the optical fiber cable according to the present disclosure.

DESCRIPTION OF EMBODIMENTS

Figure 1:
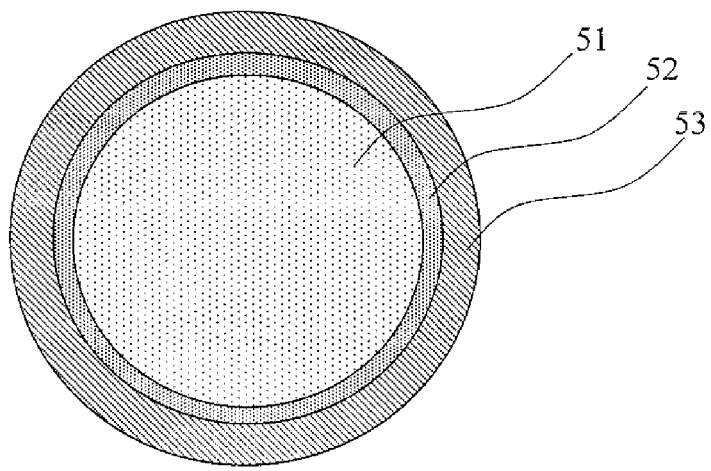
FIG. 1 is a diagram illustrating a structure of a related optical fiber cable.

Hereinafter, embodiments of the present disclosure will be described in detail below with reference to attached drawings. The present disclosure is not limited to the following embodiments. These embodiments are merely examples, and the present disclosure can be carried out in the form of various modifications and improvements, based on the knowledge of those skilled in the art, being made. In the present specification and the drawings, constituent components suffixed by the same reference numerals shall indicate the same components.

Embodiment 1

An exemplary cross-sectional structure of an optical fiber cable according to the present disclosure will be described with reference to FIG. 2. The optical fiber cable illustrated in FIG. 2 includes a cable core 11, an inner layer sheath 12, a metal sheath 13, an outer layer sheath 14, and an outer sheath tearing string 15. The cable core 11 is arranged at a central portion of the optical fiber cable, and includes a plurality of optical fibers gathered together. The inner layer sheath 12 is arranged on an outer circumference of the cable core 11 to sheath the cable core 11. The inner layer sheath 12 may include a tension member that protects the optical fibers against a tensile force acting on the optical fiber cable. The material of the inner layer sheath 12 is, for example, polyethylene, frame-retardant polyethylene, polyvinyl chloride, or the like. The cable core 11 and the inner layer sheath 12 are collectively referred to as a cable body. The metal sheath 13 is arranged on an outer circumference of the inner layer sheath 12, and is wound around the inner layer sheath 12. The material of the metal sheath 13 is, for example, stainless steel, steel, iron or the like. The outer layer sheath 14 is arranged on an outer circumference of the metal sheath 13 to sheath the metal sheath 13. The material of the outer layer sheath 14 is, for example, polyethylene, frame-retardant polyethylene, polyvinyl chloride, or the like. The metal sheath 13 and the outer layer sheath 14 are collectively referred to as an external sheath. The optical fiber cable according to the present disclosure includes at least one outer sheath tearing string 15 arranged in the longitudinal direction inside the metal sheath 13 to tear the metal sheath 13 and the outer layer sheath 14. The outer sheath tearing string 15 is required to be arranged inside the metal sheath 13. The at least one outer sheath tearing string 15 needs to be provided, or two or more outer sheath tearing strings may be provided. The material of the outer sheath tearing string 15 is, for example, Tetron fiber, Kevlar fiber, aramid fiber, polyester fiber, or the like, which are excellent in tensile strength and can be used as they are or twisted together. These structures are the same in the following embodiments.

Figure 2:
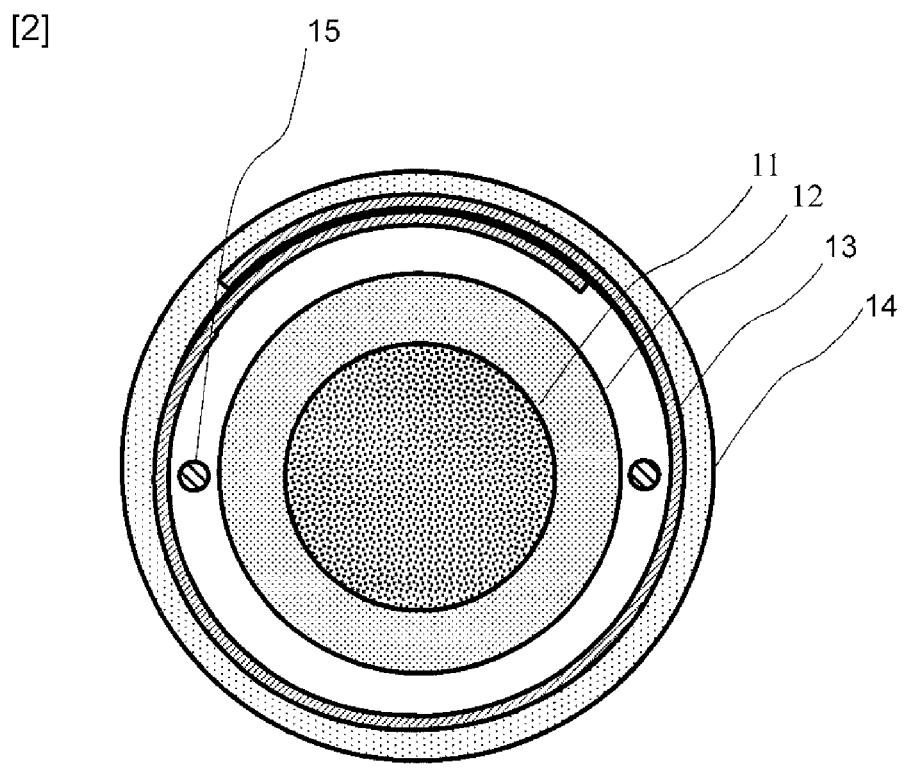
FIG. 2 is a diagram illustrating an exemplary structure of an optical fiber cable according to the present disclosure.

In the optical fiber cable according to the present embodiment, the outer sheath tearing string 15 may be arranged between the metal sheath 13 and the inner layer sheath 12, as illustrated in FIG. 2. Arranging the outer sheath tearing string 15 between the metal sheath 13 and the inner layer sheath 12 facilitates taking out the outer sheath tearing string 15.

Even if there is the metal sheath 13 introduced as the countermeasure against bird, insect, and animal damages, providing the outer sheath tearing string 15 can facilitate tearing the metal sheath 13 and the outer layer sheath 14. That is, the optical fiber cable can be disassembled using the outer sheath tearing string 15, without using a dedicated tool, and without damaging the optical fiber. The disassembling method using the outer sheath tearing string 15 requires no high-degree skill and can shorten the required time.

Embodiment 2

Figure 3:
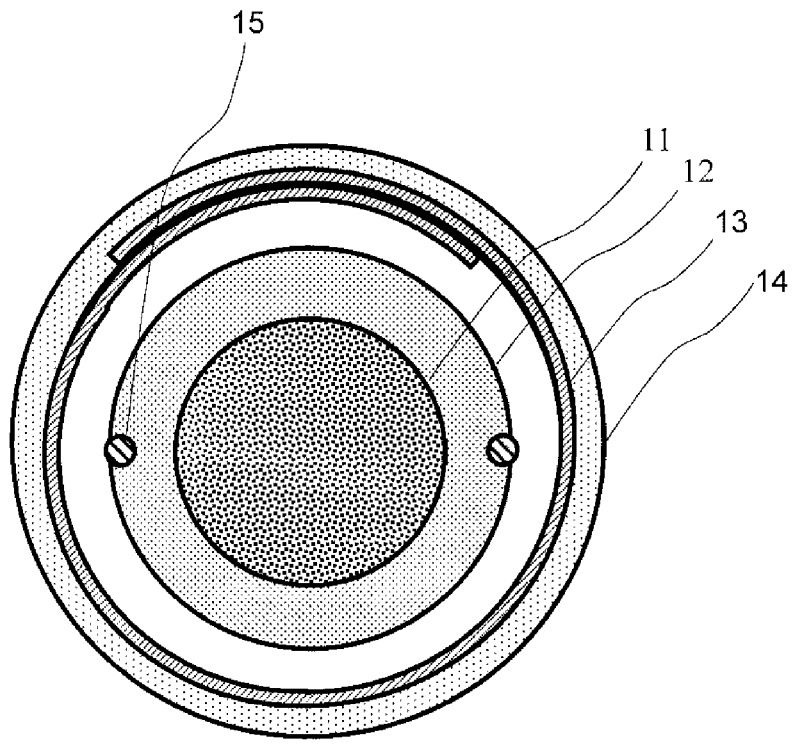
FIG. 3 is a diagram illustrating an exemplary structure of the optical fiber cable according to the present disclosure.

An exemplary cross-sectional structure of the optical fiber cable according to the present disclosure will be described with reference to FIG. 3. The optical fiber cable illustrated in FIG. 3 includes a cable core 11, an inner layer sheath 12, a metal sheath 13, an outer layer sheath 14, and an outer sheath tearing string 15. At least a part of the outer sheath tearing string 15 may be embedded in an outer peripheral surface of the inner layer sheath 12. That is, the outer sheath tearing string 15 may have a part embedded in the inner layer sheath 12 and another part exposed from the inner layer sheath 12. The outer sheath tearing string 15 may be entirely embedded in the inner layer sheath 12. Being partly embedded in this case indicates a state where a part of the outer sheath tearing string 15 is embedded in the inner layer sheath 12 in a cross section perpendicular to a longitudinal direction of the optical fiber cable, as illustrated in FIG. 3.

Embedding at least a part of the outer sheath tearing string 15 in the inner layer sheath 12 can prevent the outer sheath tearing string 15 from moving in the circumferential direction or coming off in the longitudinal direction between the inner layer sheath 12 and the metal sheath 13. Increasing an embedment rate of the outer sheath tearing string 15 in the inner layer sheath 12 enhances the above effect. This results in facilitating tearing the metal sheath 13 and the outer layer sheath 14.

Embodiment 3

An exemplary cross-sectional structure of the optical fiber cable according to the present disclosure will be described with reference to FIG. 4. The optical fiber cable illustrated in FIG. 4 includes a cable core 11, an inner layer sheath 12, a metal sheath 13, an outer layer sheath 14, an outer sheath tearing string 15, and an inner sheath tearing string 16. The optical fiber cable according to the present disclosure includes at least one inner sheath tearing string 16 that is arranged in a longitudinal direction inside a layer of the inner layer sheath 12 to tear the inner layer sheath 12.

Figure 4:
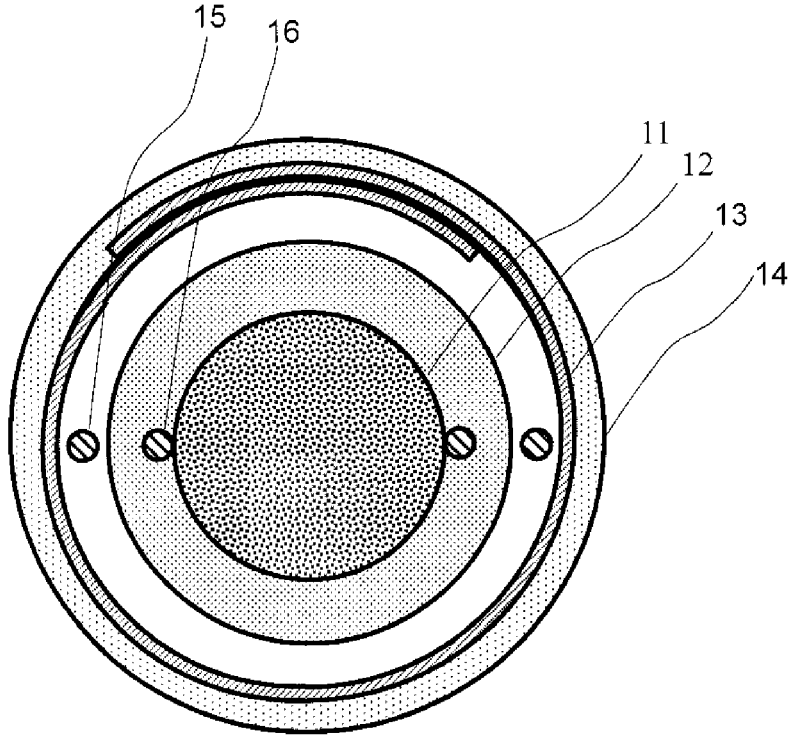
FIG. 4 is a diagram illustrating an exemplary structure of the optical fiber cable according to the present disclosure.

The optical fiber cable illustrated in FIG. 4 has an exemplary structure including the inner sheath tearing string 16 in addition to the optical fiber cable described in the embodiment 1. The at least one inner sheath tearing string 16 needs to be provided, or two or more inner sheath tearing strings may be provided. Including the inner sheath tearing string 16 can facilitate tearing the inner layer sheath 12.

Embodiment 4

An exemplary cross-sectional structure of the optical fiber cable according to the present disclosure will be described with reference to FIG. 5. The optical fiber cable illustrated in FIG. 5 includes a cable core 11, an inner layer sheath 12, a metal sheath 13, an outer layer sheath 14, an outer sheath tearing string 15, and an inner sheath tearing string 16. The optical fiber cable according to the present disclosure includes at least one inner sheath tearing string 16 arranged in a longitudinal direction inside a layer of the inner layer sheath 12 to tear the inner layer sheath 12.

Figure 5:
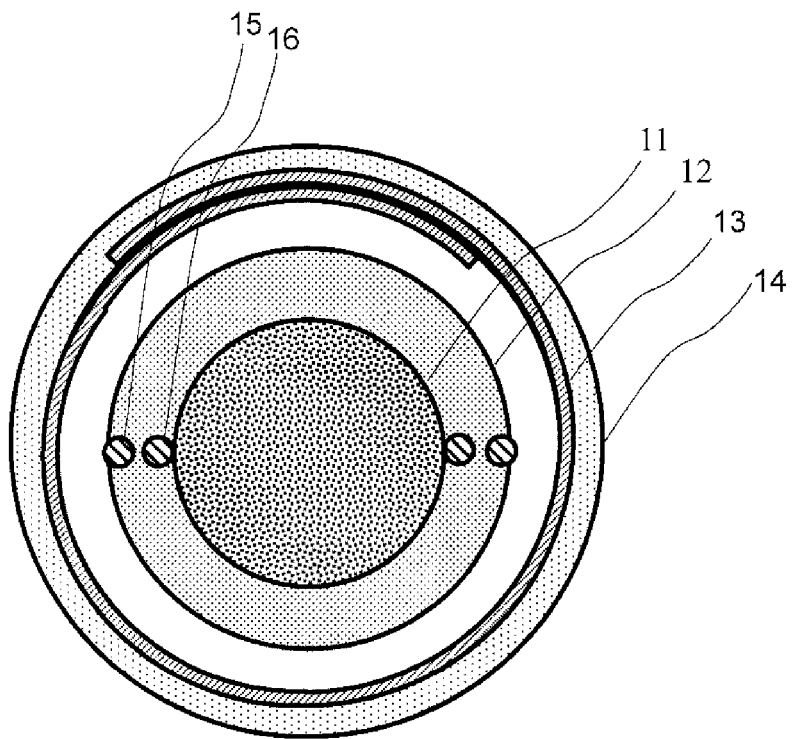
FIG. 5 is a diagram illustrating an exemplary structure of the optical fiber cable according to the present disclosure.

The optical fiber cable illustrated in FIG. 5 has an exemplary structure including the inner sheath tearing string 16 in addition to the optical fiber cable described in the embodiment 2. The at least one inner sheath tearing string 16 needs to be provided, or two or more inner sheath tearing strings may be provided. Including the inner sheath tearing string 16 can facilitate tearing the inner layer sheath 12.

Embodiment 5

An exemplary cross-sectional structure of the optical fiber cable according to the present disclosure will be described with reference to FIG. 6. The optical fiber cable illustrated in FIG. 6 includes a cable core 11, an inner layer sheath 12, a metal sheath 13, an outer layer sheath 14, an outer sheath tearing string 15, and a continuous protrusion 17. The optical fiber cable according to the present disclosure includes the continuous protrusion 17 arranged on an outer peripheral surface of the inner layer sheath 12 and extending along the outer sheath tearing string 15.

Figure 6:
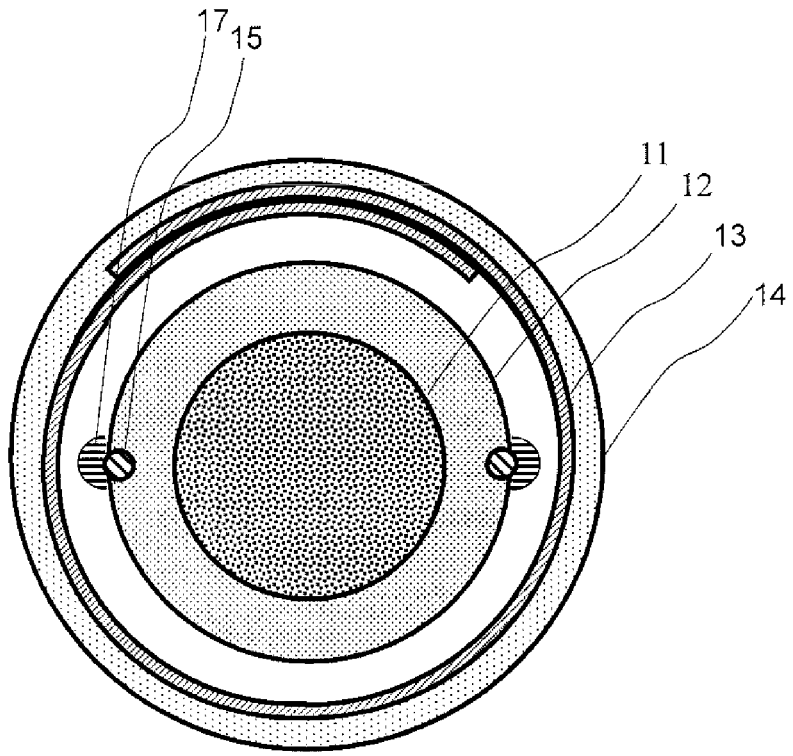
FIG. 6 is a diagram illustrating an exemplary structure of the optical fiber cable according to the present disclosure.

The optical fiber cable illustrated in FIG. 6 has an exemplary structure including the continuous protrusion 17 in addition to the optical fiber cable described in the embodiment 2. When there are multiple outer sheath tearing strings 15, the continuous protrusion 17 may be provided along one outer sheath tearing string 15, or the continuous protrusion 17 may be provided along any one of the multiple outer sheath tearing strings 15. Including the continuous protrusion 17 additionally can easily identify a position of the outer sheath tearing string 15, and the work for taking out the outer sheath tearing string 15 becomes easy. This results in facilitating tearing the metal sheath 13 and the outer layer sheath 14.

Embodiment 6

An exemplary cross-sectional structure of the optical fiber cable according to the present disclosure will be described with reference to FIG. 7. The optical fiber cable illustrated in FIG. 7 includes a cable core 11, an inner layer sheath 12, a metal sheath 13, an outer layer sheath 14, an outer sheath tearing string 15, an inner sheath tearing string 16, and a continuous protrusion 17. The optical fiber cable according to the present disclosure includes the continuous protrusion 17 arranged on the outer peripheral surface of the inner layer sheath 12 and extending along the outer sheath tearing string 15, and the inner sheath tearing string 16 and the outer sheath tearing string 15 are arranged on the same radial axis of the optical fiber cable. The radial axis is an axis extending radially in an outer circumference direction from a center point of the optical fiber cable.

Figure 7:
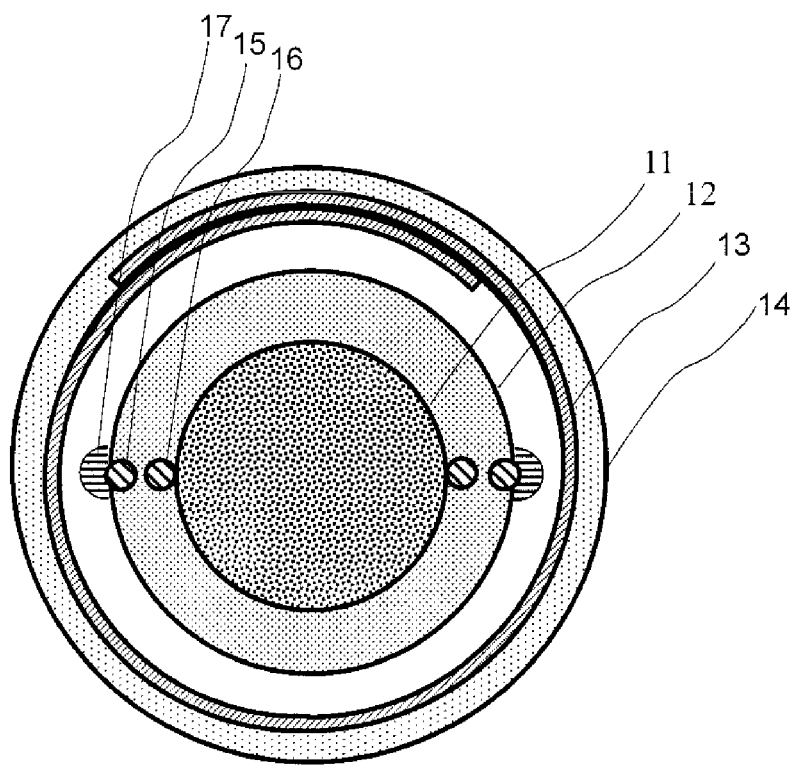
FIG. 7 is a diagram illustrating an exemplary structure of the optical fiber cable according to the present disclosure.

The optical fiber cable illustrated in FIG. 7 has an exemplary structure including the continuous protrusion 17 in addition to the optical fiber cable described in the embodiment 4. When there are multiple outer sheath tearing strings 15, the continuous protrusion 17 may be provided along one outer sheath tearing string 15, or the continuous protrusion 17 may be provided along any one of the multiple outer sheath tearing strings 15. Including the continuous protrusion 17 additionally can easily identify positions of the outer sheath tearing string 15 and the inner sheath tearing string 16, and the work for taking out the outer sheath tearing string 15 becomes easy. This results in facilitating tearing the metal sheath 13 and the outer layer sheath 14.

Embodiment 7

An exemplary cross-sectional structure of the optical fiber cable according to the present disclosure will be described with reference to FIG. 8. The optical fiber cable illustrated in FIG. 8 includes a cable core 11, an inner layer sheath 12, a metal sheath 13, an outer layer sheath 14, and an outer sheath tearing string 15. In the optical fiber cable according to the present disclosure, the metal sheath 13 has a part single-wounded and the rest double-wounded around an outer circumference of the cable core 11, and at least one outer sheath tearing string 15 is arranged inside the single-wounded part of the metal sheath 13.

When there is only one outer sheath tearing string 15, it is desirable that the one outer sheath tearing string 15 is arranged inside the single-wounded part of the metal sheath 13. When there are multiple outer sheath tearing strings 15, it is desirable that at least one of these outer sheath tearing strings 15 is arranged inside the single-wounded part of the metal sheath 13, and it is further desirable that two or more outer sheath tearing strings 15 are arranged inside the single-wounded part of the metal sheath 13. Arranging at least one outer sheath tearing string 15 inside the single-wounded part of the metal sheath 13 facilitates the work for taking out the outer sheath tearing string 15. Further, the metal sheath 13 and the outer layer sheath 14 can be easily torn. The same applies even when the continuous protrusion 17 is arranged as in the embodiment 5 or 6.

An exemplary design in which there are two outer sheath tearing strings 15 will be described with reference to FIG. 8. In FIG. 8, when θ1 (degree) and θ2 (degree) represent angles formed by two lines connecting two outer sheath tearing strings 15 and the center point of the optical fiber cable respectively with respect to a line perpendicular to a line connecting a center of the double-wounded part of the metal sheath 13 and the center point of the optical fiber cable, d represents a diameter of a cable body, and L represents a width of the metal sheath 13 in a circumferential direction, it is configured to satisfy the following relationships.

$$0<=\theta1, \theta2<90, \text{ and } L<=\pi d(3/2-(\theta1+\theta2)/360) \quad (1)$$

The validity of Expression (1) was verified using a 24 cores optical fiber cable and a 200 cores optical fiber cable. FIG. 9 illustrates verification results. In FIG. 9, with the cable body diameter d, angle θ1+θ2, and the width L of the metal sheath 13 in the circumferential direction as parameters, the quality of workability was qualitatively determined when Expression (1) is satisfied ("round mark" in "Expression" column of FIG. 9) and when Expression (1) is not satisfied ("X mark" in "Expression" column of FIG. 9). It was verified that the workability was good ("round mark" in "workability" column of FIG. 9) when Expression (1) was satisfied, and the workability was bad ("X mark") in "workability" column of FIG. 9) when Expression (1) was not satisfied.

Adopting such a design can prevent the outer sheath tearing string 15 from being arranged inside the double-wounded part of the metal sheath 13, and therefore the work for taking out the outer sheath tearing string 15 becomes easy. In addition, the metal sheath 13 and the outer layer sheath 14 can be easily torn. Although FIG. 8 illustrates the exemplary structure including two outer sheath tearing strings 15, even when there are three or more outer sheath tearing strings 15, it is desirable to select arbitrary two of them and determine the design so as to satisfy Expression (1).

Figure 8:
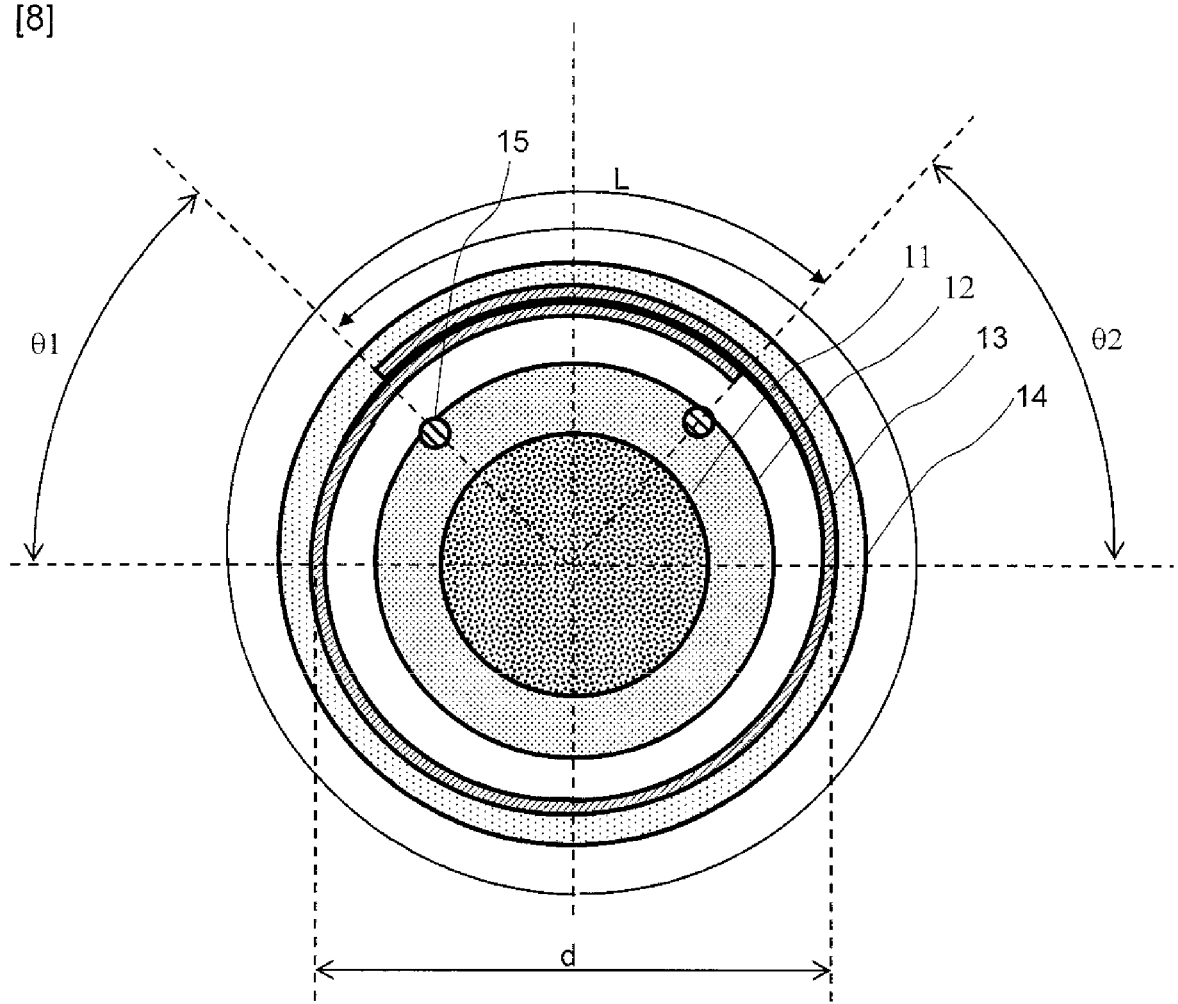
FIG. 8 is a diagram illustrating an exemplary structure of the optical fiber cable according to the present disclosure.

The optical fiber cable illustrated in FIG. 8 shows the arrangement of the outer sheath tearing string 15 by taking the optical fiber cable described in the embodiment 2 as an example. The structure of the optical fiber cable of the present embodiment is not limited to the embodiment 2 and can be also applied to the optical fiber cable of any one of the embodiments 1 to 6.

Embodiment 8

Figure 10:
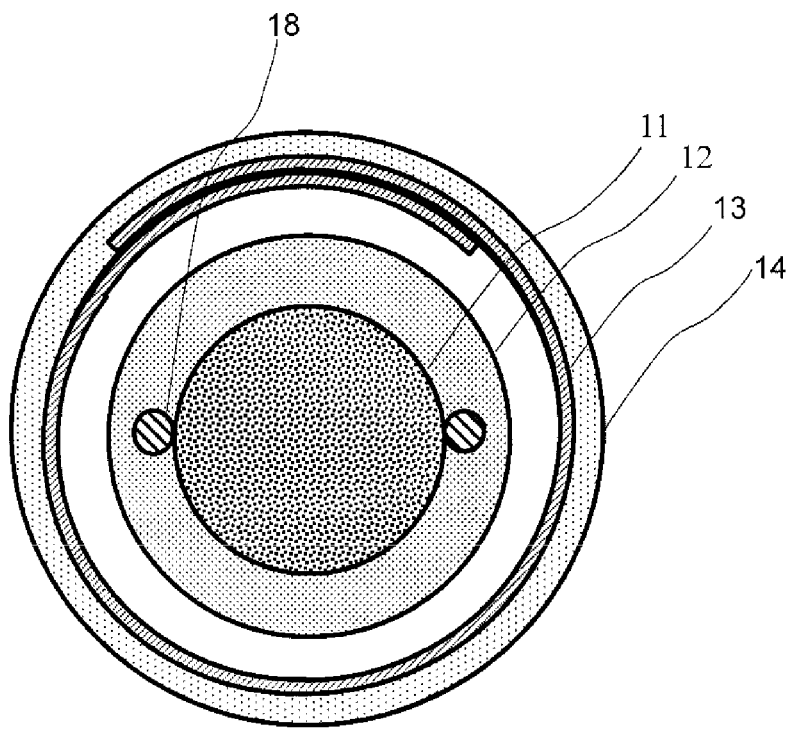
FIG. 10 is a diagram illustrating an exemplary structure of the optical fiber cable according to the present disclosure.

An exemplary cross-sectional structure of the optical fiber cable according to the present disclosure will be described with reference to FIG. 10. The optical fiber cable illustrated in FIG. 10 includes a cable core 11, an inner layer sheath 12, a metal sheath 13, an outer layer sheath 14, and a protective sheath tearing string 18. The cable core 11 is arranged at a central portion of the optical fiber cable, and includes a plurality of optical fibers gathered together. The inner layer sheath 12 is arranged on an outer circumference of the cable core 11 to sheath the cable core 11. The inner layer sheath 12 may include a tension member that protects the optical fibers against a tensile force acting on the optical fiber cable. The material of the inner layer sheath 12 is, for example, polyethylene, frame-retardant polyethylene, polyvinyl chloride, or the like. The cable core 11 and the inner layer sheath 12 are collectively referred to as a cable body. The metal sheath 13 is arranged on an outer circumference of the inner layer sheath 12, and is wound around the inner layer sheath 12. The material of the metal sheath 13 is, for example, stainless steel, steel, iron, or the like. The outer layer sheath 14 is arranged on an outer circumference of the metal sheath 13 to sheath the metal sheath 13. The material of the outer layer sheath 14 is, for example, polyethylene, frame-retardant polyethylene, polyvinyl chloride, or the like. The metal sheath 13 and the outer layer sheath 14 are collectively referred to as an external sheath. The optical fiber cable according to the present disclosure includes at least one protective sheath tearing string 18 arranged in the longitudinal direction inside a layer of the inner layer sheath 12 to tear the inner layer sheath 12, the metal sheath 13, and the outer layer sheath 14. The at least one protective sheath tearing string 18 needs to be provided, or two or more protective sheath tearing strings may be provided. The material of the protective sheath tearing string 18 is, for example, Tetron fiber, Kevlar fiber, aramid fiber, polyester fiber, or the like, which are excellent in tensile strength and can be used as they are or twisted together. These structures are the same in the following embodiments.

Even if there is the metal sheath 13 introduced as the countermeasure against bird, insect, and animal damages, providing the protective sheath tearing string 18 can facilitate tearing the inner layer sheath 12, the metal sheath 13, and the outer layer sheath 14. That is, the optical fiber cable can be disassembled using the protective sheath tearing string 18, without using a dedicated tool, or without damaging the optical fiber. The disassembling method using the protective sheath tearing string 18 requires no high-degree skill and can shorten the required time.

Embodiment 9

An exemplary cross-sectional structure of the optical fiber cable according to the present disclosure will be described with reference to FIG. 11. The optical fiber cable illustrated in FIG. 11 includes a cable core 11, an inner layer sheath 12, a metal sheath 13, an outer layer sheath 14, a protective sheath tearing string 18, and a continuous protrusion 17. The optical fiber cable according to the present disclosure includes the continuous protrusion 17 arranged on an outer peripheral surface of the inner layer sheath 12 and extending along the protective sheath tearing string 18.

Figure 11:
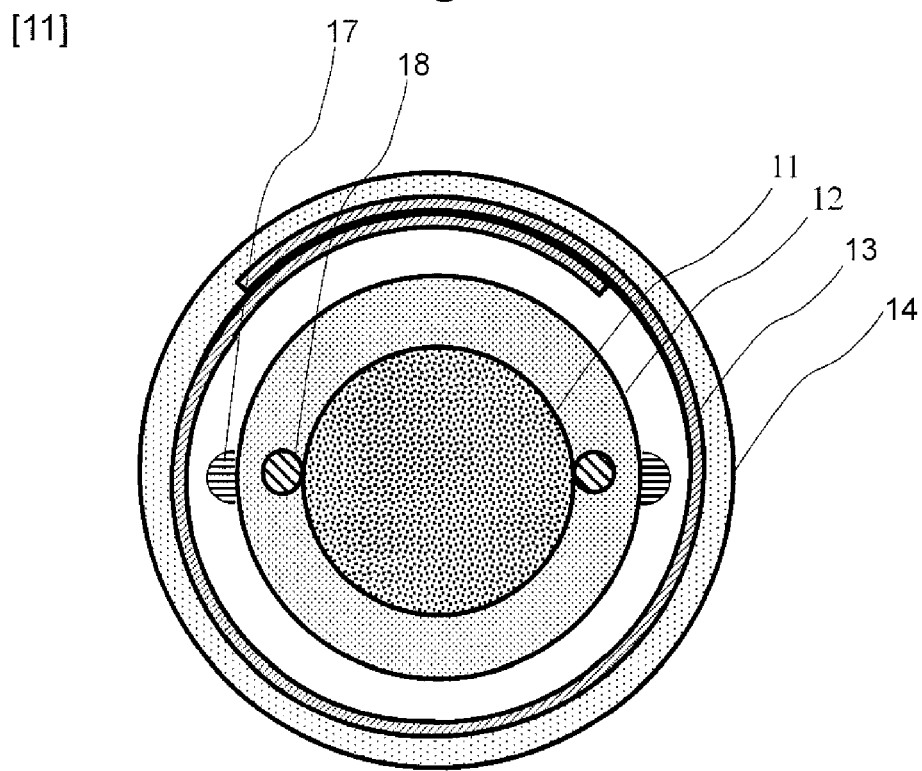
FIG. 11 is a diagram illustrating an exemplary structure of the optical fiber cable according to the present disclosure.

The optical fiber cable illustrated in FIG. 11 has an exemplary structure including the continuous protrusion 17 in addition to the optical fiber cable described in the embodiment 8. When there are multiple protective sheath tearing strings 18, the continuous protrusion 17 may be provided along one protective sheath tearing string 18, or the continuous protrusion 17 may be provided along any one of the multiple protective sheath tearing strings 18. Including the continuous protrusion 17 additionally can easily identify the position of the protective sheath tearing string 18, and the work for taking out the protective sheath tearing string 18 becomes easy. This results in facilitating tearing the inner layer sheath 12, the metal sheath 13, and the outer layer sheath 14.

Embodiment 10

An exemplary cross-sectional structure of the optical fiber cable according to the present disclosure will be described with reference to FIG. 12. The optical fiber cable illustrated in FIG. 12 includes a cable core 11, an inner layer sheath 12, a metal sheath 13, an outer layer sheath 14, and a protective sheath tearing string 18. In the optical fiber cable according to the present disclosure, the metal sheath 13 has a part single-wounded and the rest double-wounded around the outer circumference of the cable core 11, and at least one protective sheath tearing string 18 is arranged inside the single-wounded part of the metal sheath 13.

When there is only one protective sheath tearing string 18, it is desirable that the one protective sheath tearing string 18 is arranged inside the single-wounded part of the metal sheath 13. When there are multiple protective sheath tearing strings 18, it is desirable that at least one of these protective sheath tearing strings 18 is arranged inside the single-wounded part of the metal sheath 13, and it is further desirable that two or more protective sheath tearing strings 18 are arranged inside the single-wounded part of the metal sheath 13. Arranging at least one protective sheath tearing string 18 inside the single-wounded part of the metal sheath 13 facilitates the work for taking out the protective sheath tearing string 18. Further, the inner layer sheath 12, the metal sheath 13, and the outer layer sheath 14 can be easily torn. The same applies even when the continuous protrusion 17 is arranged as in the embodiment 9.

An exemplary design in which there are two protective sheath tearing strings 18 will be described with reference to FIG. 12. In FIG. 12, when θ1 (degree) and θ2 (degree) represent angles formed by two lines connecting two protective sheath tearing strings 18 and the center point of the optical fiber cable respectively with respect to a line perpendicular to a line connecting a center of the double-wounded part of the metal sheath 13 and the center point of the optical fiber cable, d represents a diameter of a cable body, and L represents a width of the metal sheath 13 in a circumferential direction, it is configured to satisfy the following relationships.

$$0<=\theta1,\theta2<90, \text{ and } L<=\pi d(3/2-(\theta1+\theta2)/360) \quad (2)$$

The validity of Expression (2) was verified using a 24 cores optical fiber cable and a 200 cores optical fiber cable. Verification results are similar to those of the embodiment 7, and it was verified that the workability was good when Expression (2) was satisfied, and the workability was bad when Expression (2) was not satisfied.

Adopting such a design can prevent the protective sheath tearing string 18 from being arranged inside the double-wounded part of the metal sheath 13, and therefore the work for taking out the protective sheath tearing string 18 becomes easy. In addition, the inner layer sheath 12, the metal sheath 13, and the outer layer sheath 14 can be easily torn. Although FIG. 12 illustrates the exemplary structure including two protective sheath tearing strings 18, even when there are three or more protective sheath tearing strings 18, it is desirable to select arbitrary two of them and determine the design so as to satisfy Expression (2).

Figure 12:
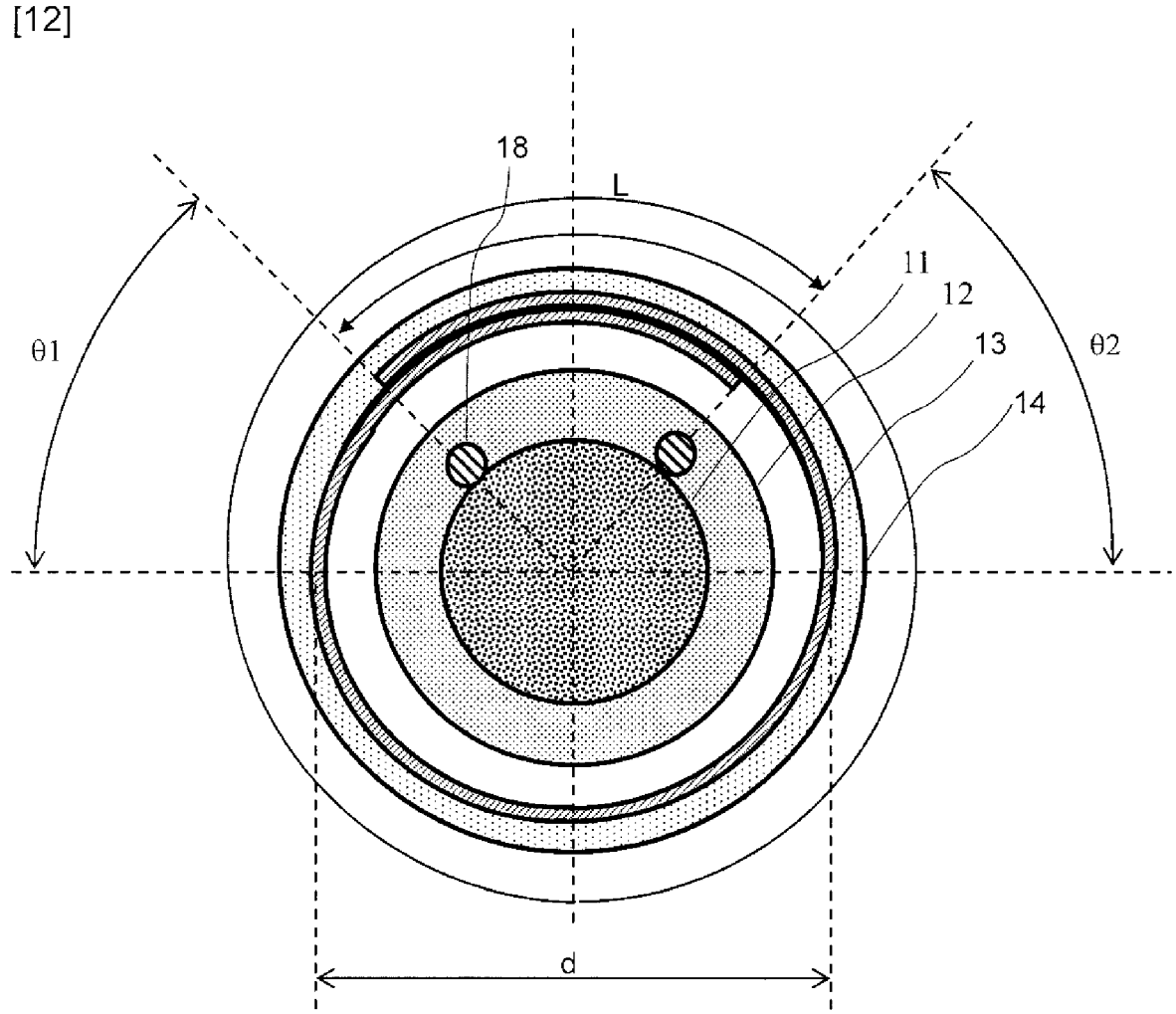
FIG. 12 is a diagram illustrating a structure of the optical fiber cable according to the present disclosure.

The optical fiber cable illustrated in FIG. 12 shows the arrangement of the protective sheath tearing string 18 by taking the optical fiber cable described in the embodiment 8 as an example. The structure of the optical fiber cable of the present embodiment is not limited to the embodiment 8 and can be also applied to the optical fiber cable of the embodiment 9.

Embodiment 11

An exemplary workflow for removing a metal sheath of the optical fiber cable according to the present disclosure will be described with reference to FIG. 13. The optical fiber cable illustrated in FIG. 13 includes an inner layer sheath 12, a metal sheath 13, a metal sheath nick 13-1, an outer layer sheath 14, an outer sheath tearing string 15, an inner sheath tearing string 16, and a fishing line 21. The fishing line 21 is an exemplary string for peeling off the outer layer sheath 14.

Figure 13:
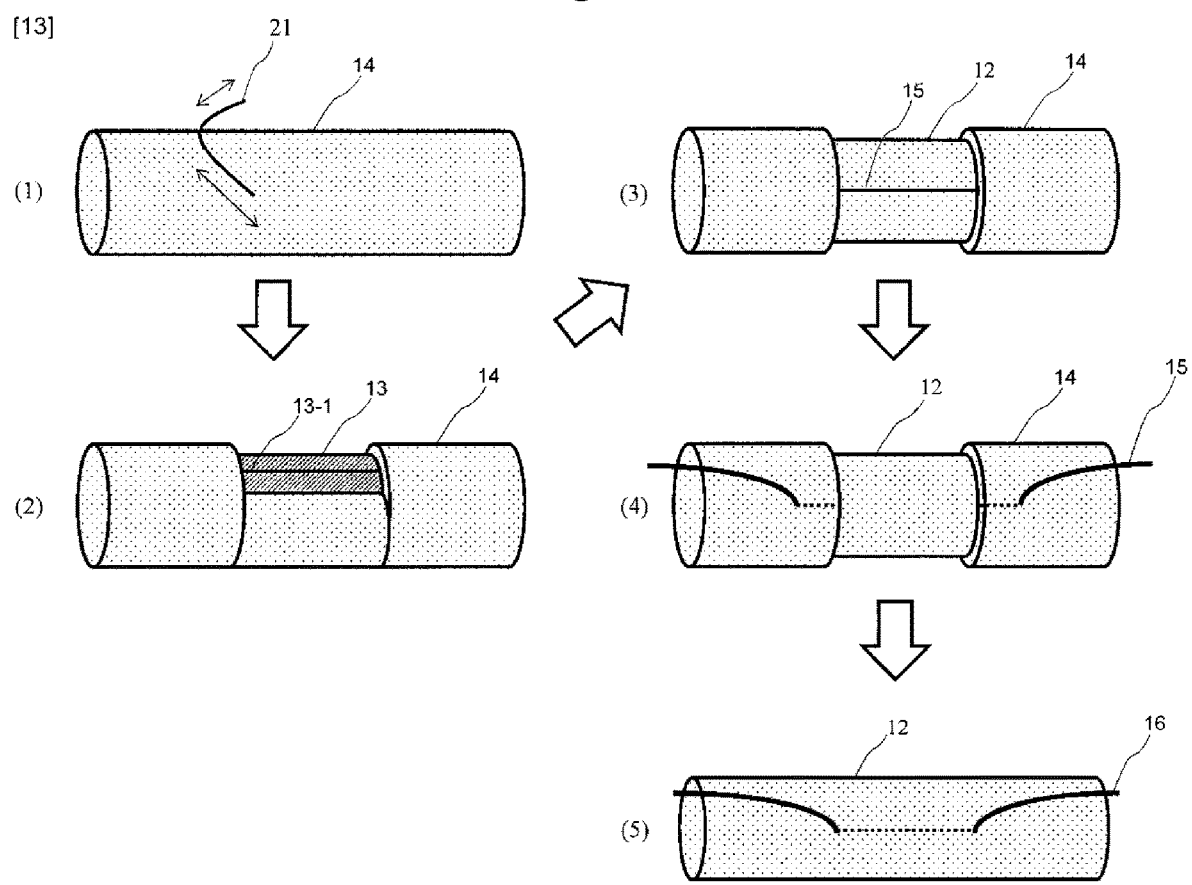
FIG. 13 is a diagram illustrating a workflow on or with the optical fiber cable according to the present disclosure.

First, the outer layer sheath 14 is peeled off partly by the fishing line 21 (see FIG. 13(1)), and the metal sheath nick 13-1 is exposed (see FIG. 13(2)). The metal sheath nick 13-1 is an outer edge of a part where the metal sheath 13 is double-wounded. Next, using a tool such as a nipper, the outer layer sheath 14 and the metal sheath 13 are peeled off from the exposed metal sheath nick 13-1 in a circumferential direction to expose the outer sheath tearing string 15 (see FIG. 13(3)). Then, using the exposed outer sheath tearing string 15, the metal sheath 13 and the outer layer sheath 14 are torn to expose the inner layer sheath 12 (see FIG. 13(4)). In the case of taking out the cable core (not illustrated) when the inner sheath tearing string 16 is arranged, the inner layer sheath 12 is further torn using the inner sheath tearing string 16 (see FIG. 13(5)). After tearing the inner layer sheath 12, the optical fibers of the cable core can be taken out.

Embodiment 12

An exemplary workflow for removing a metal sheath of the optical fiber cable according to the present disclosure will be described with reference to FIG. 14. The optical fiber cable illustrated in FIG. 14 includes an inner layer sheath 12, a metal sheath 13, a metal sheath nick 13-1, an outer layer sheath 14, a protective sheath tearing string 18, and a fishing line 21. The fishing line 21 is an exemplary string for peeling off the outer layer sheath 14.

Figure 14:
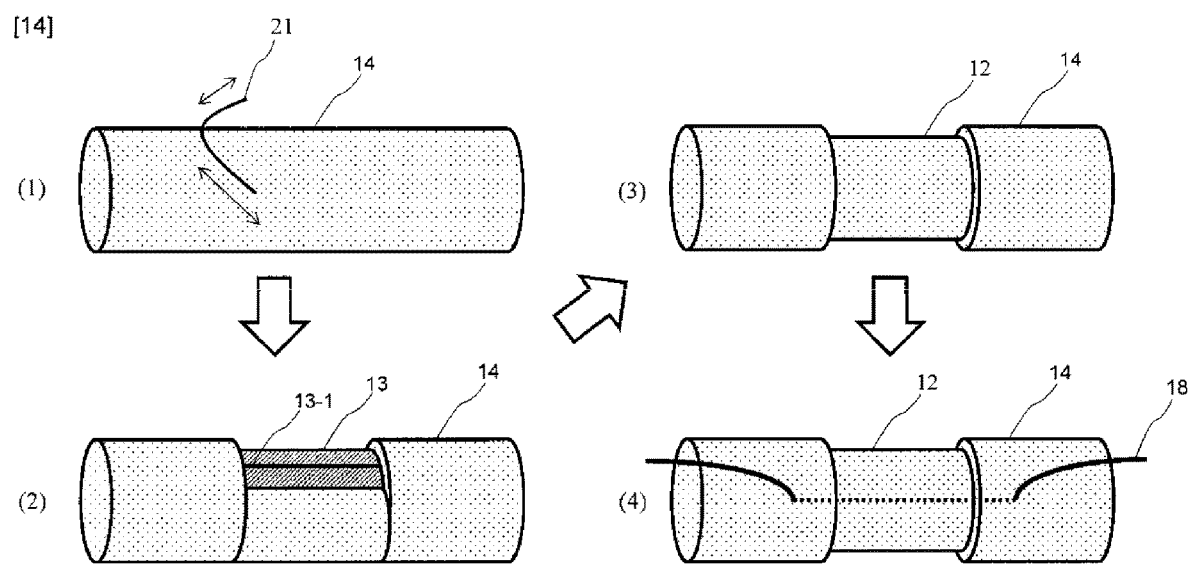
FIG. 14 is a diagram illustrating a workflow on or with the optical fiber cable according to the present disclosure.

First, the outer layer sheath 14 is peeled off partly by the fishing line 21 (see FIG. 14(1)), and the metal sheath nick 13-1 is exposed (see FIG. 14(2)). The metal sheath nick 13-1 is an outer edge of a part where the metal sheath 13 is double-wounded. Next, using a tool such as a nipper, the outer layer sheath 14 and the metal sheath 13 are peeled off from the exposed metal sheath nick 13-1 in a circumferential direction to expose the inner layer sheath 12 (see FIG. 14(3)). In the case of taking out the cable core (not illustrated), the inner layer sheath 12, the metal sheath 13, and the outer layer sheath 14 are torn using the protective sheath tearing string 18 (see FIG. 14(4)). After tearing the inner layer sheath 12, optical fibers of the cable core can be taken out.

INDUSTRIAL APPLICABILITY

The present disclosure relates to optical fiber cables provided with the countermeasure against bird, insect, and animal damages, and can be widely used in the communications industry.

REFERENCE SIGNS LIST 11 cable core
12 inner layer sheath 13 metal sheath
13-1 metal sheath nick
14 outer layer sheath
15 outer sheath tearing string
16 inner sheath tearing string
17 continuous protrusion
18 protective sheath tearing string
21 fishing line
51 cable core
52 metal sheath
53 polyethylene jacket

The invention claimed is:

1. An optical fiber cable comprising:
a cable core arranged at a central portion and accommodating a plurality of optical fibers gathered together;
an inner layer sheath arranged on an outer circumference of the cable core and sheathing the cable core;
a metal sheath arranged on an outer circumference of the inner layer sheath and includes a part single-wound and the rest double-wound around the inner layer sheath;
an outer layer sheath arranged on an outer circumference of the metal sheath and sheathing the metal sheath; and
at least one outer sheath tearing string arranged in a longitudinal direction inside the metal sheath and inside the part single-wound of the metal sheath, and includes a part embedded in the inner layer sheath and another part exposed from the inner layer sheath.

2. The optical fiber cable according to claim 1, further comprising at least one inner sheath tearing string arranged in a longitudinal direction inside a layer of the inner layer sheath.

3. The optical fiber cable according to claim 1, further comprising a continuous protrusion arranged on an outer peripheral surface of the inner layer sheath and extending along the outer sheath tearing string.

4. The optical fiber cable according to claim 2, further comprising a continuous protrusion arranged on an outer peripheral surface of the inner layer sheath and extending along the outer sheath tearing string, wherein the inner sheath tearing string and the outer sheath tearing string are arranged on the same radial axis of the optical fiber cable.

* * * * *